United States Patent [19]

Logan et al.

[11] 4,200,252
[45] Apr. 29, 1980

[54] HELICOPTER ANTITORQUE SYSTEM USING CIRCULATION CONTROL

[75] Inventors: Andrew H. Logan, Rancho Palos Verdes; Richard E. Moore, Los Angeles, both of Calif.

[73] Assignee: Summa Corporation, Las Vegas, Nev.

[21] Appl. No.: 862,814

[22] Filed: Dec. 21, 1977

[51] Int. Cl.$^2$ ............................................. B64C 27/82
[52] U.S. Cl. ................... 244/17.19; 244/207; 244/130
[58] Field of Search ................... 244/17.19, 17.11, 130, 244/207, 208, 52, 87

[56] References Cited

U.S. PATENT DOCUMENTS

| 3,020,003 | 2/1962 | Frost et al. | 244/52 |
|---|---|---|---|
| 3,059,877 | 10/1962 | Lee | 244/17.19 |
| 3,756,540 | 9/1973 | Williams | 244/207 |
| 3,807,662 | 4/1974 | Velazquez | 244/17.19 |

FOREIGN PATENT DOCUMENTS

| 883462 | 7/1943 | France | 244/17.19 |
|---|---|---|---|
| 1298518 | 6/1962 | France | 244/17.19 |

OTHER PUBLICATIONS

Lockwood, Vernard; "Lift Generation on a Circular Cylinder by Tangential Blowing from Surface Slots", NASA TN-D-244.

*Primary Examiner*—Galen L. Barefoot
*Attorney, Agent, or Firm*—Smyth, Pavitt, Siegemund, Jones & Martella

[57] ABSTRACT

An antitorque system for use in a helicopter produces antitorque moments with efficiency comparable to that of the tail rotor it is designed to replace. The antitorque forces are generated mainly from the main rotor downwash by the circulation control effect. The downwash is deflected laterally as it passes around the tail boom by a sheet of air continuously discharged tangentially to the surface of the tail boom on one side of it at velocities in the range 30 to 120 meters per second from slots extending longitudinally along the tail boom and having a width in the range 4 to 20 millimeters. The discharged air is supplied by a relatively low-pressure-ratio fan within the fuselage which directs a stream of air rearwardly into the tail boom. The tail boom is provided at its rear end with a laterally disposed aperture through which some of the fan-supplied air is discharged to create a direct jet thrust. The flow through the aperture is throttled to vary the antitorque moment for trim and maneuvering.

10 Claims, 5 Drawing Figures

HELICOPTER ANTITORQUE SYSTEM USING CIRCULATION CONTROL

BACKGROUND OF THE INVENTION

1. Field of the Invention

The present invention is in the field of helicopters and more particularly relates to an antitorque system replacing the conventional tail rotor.

2. The Prior Art

The advantages of eliminating the conventional tail rotor of a helicopter have long been appreciated. The foremost advantage is the increased safety, particularly to ground personnel. The tail rotor also presents reliability and maintainability problems due to the requirements for multiple right-angle gear boxes, bearings and high rotational speed shafting. In military helicopters the tail rotor is ballistically vulnerable in that a direct hit on the tail rotor can cause sudden and complete loss of antitorque force and yaw control with catastrophic consequences.

The present invention is intended as a replacement for the tail rotor, and its operation is based on the principle of circulation control. Circulation control is a subtle aerodynamic phenomenon in which the bulk flow around a body is deflected by a sheet of air ejected tangentially to the body surface. The deflection of the bulk flow causes a body force in the direction opposite the deflection. Successful force generation by circulation control depends upon many parameters including the strength of the tangential jet relative to the bulk flow, its location and direction, and its thickness. The phenomenon is similar to that by which a baseball is made to follow a curved trajectory.

In U.S. Pat. No. 3,059,877 issued Oct. 23, 1962 to Lee, there is shown a helicopter antitorque system employing the principle of circulation control. That patent describes how exhaust from the main power plant can be conducted rearward through a duct to a chamber in the aft section of the fuselage, from which it is discharged through longitudinally-extending slots located in the downwash of the main rotor.

It is well known in the art that at high speeds of flight the downwash of the main rotor does not flow around the aft section of the fuselage. The fuselage moves out of the way before the downwash can reach it, and, relative to the fuselage, the downwash has a large horizontal velocity component. Thus, the circulation control technique cannot be depended on to provide antitorque forces at high speeds of flight.

This limitation of the circulation control technique can be overcome to some degree by the provision of additional means for producing antitorque forces at high flight speeds. Such means could conceivably include aerodynamic trim surfaces or reaction jets.

A jet of air emerging from the tail of the helicopter in a lateral direction has long been considered as a viable approach to production of antitorque forces. This approach is exemplified in the following U.S. Pat. Nos.: 2,433,251 to Whiting (1947); 2,486,272 to Gazda (1949); 2,503,172 to Pullin (1950); 2,518,697 to Lee (1950); 3,036,068 to Spearman (1962); and 3,510,087 to Strickland (1970).

A helicopter antitorque system combining circulation control with a reaction jet is disclosed in U.S. Pat. No. 3,807,662, issued Apr. 20, 1974 to Velazquez. Velazquez employs a main rotor-driven axial compressor fan and diffuser to supply high velocity air to a variable-geometry nozzle at the end of an enlarged duct extending through the tail boom. An echelon of turnable vanes located within the tail boom at its end permits the generation of either an antitorque force or a forward propulsion thrust, or both, selectively. In addition to this well-known air jet technique, Velazquez implements the circulation control principle by providing circulation slots extending lengthwise along the tail boom and positioned within the maximum velocity region of the downwash from the main rotor blades. Some of the high pressure air generated by the compressor fan is discharged through the slots tangentially to the surface of the tail boom to provide an antitorque moment after the manner of Lee, supra. The slots are provided with automatically closing lips but the nature of the automatic closing mechanism is not disclosed.

At the time of Velazquez' work it was generally believed by those skilled in the art that effective circulation control forces could be obtained only if the air were discharged at speeds approaching sonic, through extremely narrow slots of widths on the order of 0.5 mm. To produce the very high speed air flow than believed necessary was very inefficient and wasteful of power. In addition, there was a possibility that the extremely narrow slots might become clogged or their critical dimensions might become altered.

In his patent, Velazquez states that his invention comprehends the use of a high-pressure-ratio supersonic fan such as is currently employed in modern turbofan engines. That Velazquez contemplated the use of a high velocity airstream discharged through the circulation control slots is evidenced further by his use of a diffuser in conjunction with the high-pressure-ratio supersonic fan.

Further, the vanes which Velazquez provides at the tail are adapted for producing both forward thrust and antitorque forces, and therefore are less efficient in producing the antitorque forces than if they had been designed solely for that purpose. Thus, although Velazquez combines the jet thruster with circulation control, his antitorque system is highly inefficient because it was based on the then-prevailing understanding that effective circulation could only be obtained by the use of a very high velocity discharge through an extremely narrow slot.

SUMMARY OF THE INVENTION

The above-noted inefficiencies inherent in the prior art approach to circulation control have been largely overcome by the present invention. In the present invention, circulation control provides the majority of the antitorque force in hover with the tail jet providing the additional trim antitorque force as well as the maneuver force. The present invention is based upon the discovery that effective circulation control forces can be generated by the use of slots ten times wider than those used in the prior art systems. Correspondingly, the discharge velocities used in the present invention are only one-fourth or one-fifth of those used in the prior art. Since the power required varies as the cube of the discharge velocity, approximately, it can be appreciated that the circulation control system of the present invention requires only a small fraction of the power required by prior art circulation control systems.

In a typical application, the circulation control system of the present invention is so efficient that it is advantageous in terms of weight to replace the conventional tail rotor with the circulation control system of the present invention.

Because a relatively low-pressure-ratio fan is used to supply the air flow, there is no need for a diffuser such as is required with the high-pressure-ratio high-velocity fans used in the prior art. The circulation control system of the present invention employs air discharge velocities typically ranging from 30 to 120 meters per second, in contrast with the sonic speeds employed in the prior art systems.

In a typical application, the width of the slots used in the present invention ranges from 4 to 20 mm., in contrast to the 0.5 mm. slot width used in prior art systems. As a result, the exact width of the slot is much less critical in the present invention and the possibility of its becoming clogged with foreign matter is effectively eliminated.

In the present invention, the reaction jet located at the end of the tail boom is used exclusively for the generation of antitorque forces and is not used for forward thrust. As a result, it is not necessary to provide a mechanism for turning the vanes, as was the case with the prior art systems. In the present invention, the torque produced by the jet in the tail is controlled by throttling the exit area.

In a preferred embodiment of the present invention, a single slot is used in the tail boom and it is located 140 degrees about the axis from the top vertical center line. In this embodiment, the average momentum coefficient is approximately 0.4 and the ratio of jet velocity to maximum rotor downwash velocity is approximately 3.5. A slot width of approximately 6 mm. is used with a discharge velocity of approximately 69 meters per second. This embodiment appears to be optimal for an existing helicopter, but it must be appreciated that other embodiments of the present invention would be optimal for other helicopters.

With the advent of the present invention, the circulation control antitorque system has become competitive with the tail rotor used in conventional helicopters on a pound-for-pound basis. Thus, the tail rotor can be replaced with no net penalty in weight or additional power requirements.

The novel features which are believed to characterize the invention, both as to structure and method of operation, together with further objects and advantages thereof, will be better understood from the following description considered in connection with the accompanying drawings in which the preferred embodiment of the invention is illustrated by way of example.

DESCRIPTION OF THE PREFERRED EMBODIMENT

Figure 1:
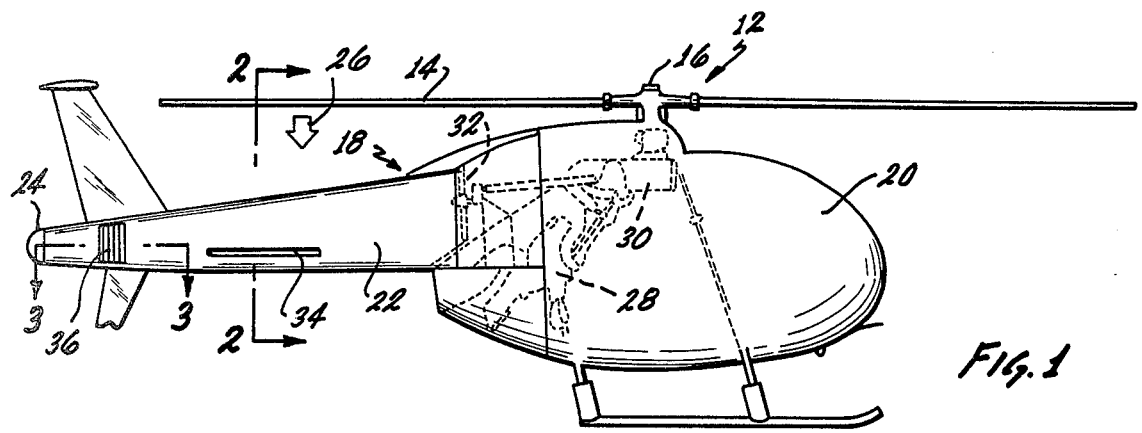
FIG. 1 is a side elevation view of a helicopter including the antitorque system of the present invention.

Turning now to the drawings, in which like parts are denoted by the same reference numeral throughout, there is shown in FIG. 1 a helicopter 12 of the type in which the present invention is employed. The helicopter 12 includes a main rotor 14 which revolves in a counter-clockwise direction about an axis through its center 16 as viewed from above. A fuselage designated generally as 18 is suspended beneath the main rotor 14. The fuselage 18 includes a cabin 20 where the pilot sits, and further includes an elongated portion 22 extending from beneath the center 16 of the main rotor aftward to an aft end 24 of the fuselage. The elongated portion 22 of the fuselage extends within the region through which the downwash 26 passes when the helicopter is hovering, as may be appreciated from FIG. 2. The fuselage 22 also contains the main power plant 28 and a transmission 30. According to the present invention, the fuselage also contains a subsonic low-pressure ratio fan 32. In a preferred embodiment of the present invention, the fan 32 is driven by the transmission 30 which, in turn, is powered by the main power plant 28. In other embodiments, the fan 32 could be driven by its own separate power plant.

Figure 1A:
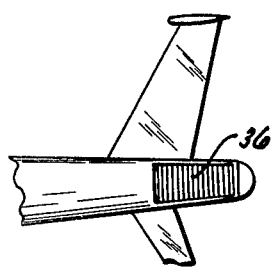
FIG. 1a is a fragmentary side elevation view showing the left side of the aft portion of the fuselage of the helicopter.

As will be described in greater detail below, the purpose of the fan 32 is to blow air into a chamber within the aft portion of the fuselage 22 so that an overpressure is maintained in that chamber. The chamber serves as a source of fluid under pressure and is used to provide a supply of pressurized air for discharge through the linear nozzle or slot 34 as well as through the jet thruster 36 located at the aft end 24 of the fuselage 22. As shown in FIGS. 1 and 1a, the jet thruster 36 in a preferred embodiment is designed to discharge air in a lateral direction from both sides of the fuselage selectively in a preferred embodiment. In that embodiment, as will be described more fully below, the main discharge from the jet thruster is normally on the side of the fuselage opposite the side on which the linear nozzle 34 is located, so that the reaction produced by the jet thruster 36 and the force produced by the linear nozzle 34 combine to overcome the tendency of the fuselage to rotate in the clockwise direction as viewed from above. Thus, the discharge area of the jet thruster provided on the left side of the helicopter is normally greater than the discharge area on the right side of the helicopter. The discharge area on the right side of the helicopter is used mainly when the main rotor 14 is free-wheeling, in which case there is a slight tendency for the fuselage to rotate in the counter-clockwise direction, as viewed from above.

Figure 2:
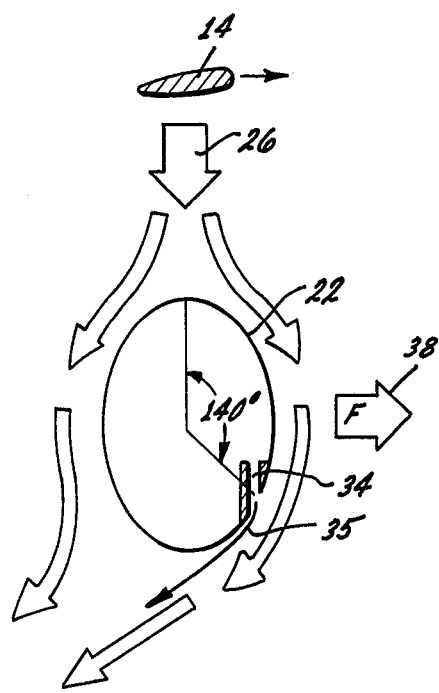
FIG. 2 is a diagram of a cross-sectional view of the fuselage in the direction 2—2 of FIG. 1 and showing the effect of the linear nozzle on the flow of downwash around the fuselage.

As shown in FIG. 2, the main rotor 14 produces a downwash 26 which normally flows downwardly around the sides of the fuselage 22 to recombine below the fuselage as indicated. The slot 34 is oriented to discharge a thin sheet 35 of moving air substantially tangentially to the fuselage 22 as shown in FIG. 2. Because the discharged sheet of air is moving faster than the downwash, less pressure is exerted on the right side of the fuselage than on the left side of the fuselage because of the Bernoulli effect. Therefore, a force 38 is exerted on the fuselage tending to push it to the right as shown in FIG. 2, which in turn tends to counter the tendency of the fuselage to rotate in a clockwise direction as viewed from above. In a preferred embodiment, the slot is located approximately 140 degrees around the fuselage from its top, as shown in FIG. 2. It has been found experimentally that angles between 70 and 160 degrees are preferred.

The strength of the discharge through the slot can be specified in terms of the slot width, the discharge velocity, and the density of the fluid discharged. It is useful to express the strength of the discharge as a single number called the momentum coefficient. The advantage of describing the discharge in terms of the momentum coefficient is that experimental results can be scaled from ship to ship. That is, the same effect will be obtained in small helicopters and large helicopters provided the momentum coefficient is the same in each case.

In the present discussion, the momentum coefficient is defined as:

$$\text{Momentum Coefficient} = 2\left(\frac{\text{density of jet}}{\text{air density}}\right)\left(\frac{\text{discharge velocity}}{\text{downwash velocity}}\right)^2\left(\frac{\text{slot width}}{\text{fuselage diameter}}\right)$$

It has been found experimentally that useful values of the momentum coefficient lie in the range 0.2 to 0.8 approximately, with the optimum being 0.4 approximately.

Such values of the momentum coefficient are required for successful operation of the circulation control antitorque system, and clearly such values can be obtained through any of an infinitude of combinations of slot widths and discharge velocities. As described above, prior art systems have employed extremely narrow slots and extremely high discharge velocities—a combination requiring prodigious power to operate. The power required varies as the cube of the discharge velocity, approximately.

The attractiveness of the present invention is based on the recognition that less power would be required if the discharge velocity could be reduced. To do this and still maintain a sufficient momentum coefficient requires the use of a considerably wider slot than had previously been thought to be feasible. The present invention is based on the discovery that a much wider slot can indeed be used. According to the present invention, slot widths ranging from 4.0 to 20.0 millimeters are used in conjunction with discharge velocities between 2.5 and 4.5 times the rotor downwash velocity, i.e., from 30 to 120 meters per second in typical applications. This contrasts sharply with the slot widths on the order of 0.5 mm. and discharge velocities on the order of 300 meters per second employed in prior art circulation control systems. Accordingly, the system of the present invention requires less than 33% of the power required by a typical prior art system. This striking difference in power required is sufficient to permit the system of the present invention to be competitive with conventional tail rotors on a pound-for-pound, horsepower-for-horsepower basis.

When the helicopter is hovering, the downwash from the main rotor 14 is directed predominantly downwardly beneath the main rotor. Accordingly, the linear nozzle 34 is positioned along the fuselage at a location which normally lies in the tastest part of the downwash when the helicopter is hovering. A different situation prevails, however, when the helicopter is moving, particularly at high speeds. At high speeds, the horizontal velocity component of the downwash may exceed its vertical velocity component. As a result, when the helicopter is moving through the air, it is entirely possible that the downwash may not pass over the linear nozzle 34. This is also the case when the helicopter is descending, particularly it the main rotor 14 is freewheeling during the descent. Under such conditions, the effectiveness of the circulation control system is greatly reduced or eliminated and if the antitorque system is to be usable at both high flight speeds as well as at low flight speeds, an additional means of producing antitorque forces must be provided. According to the present invention, the additional means for producing antitorque forces is the jet thruster 36 located near the aft end of the fuselage.

Figure 3:
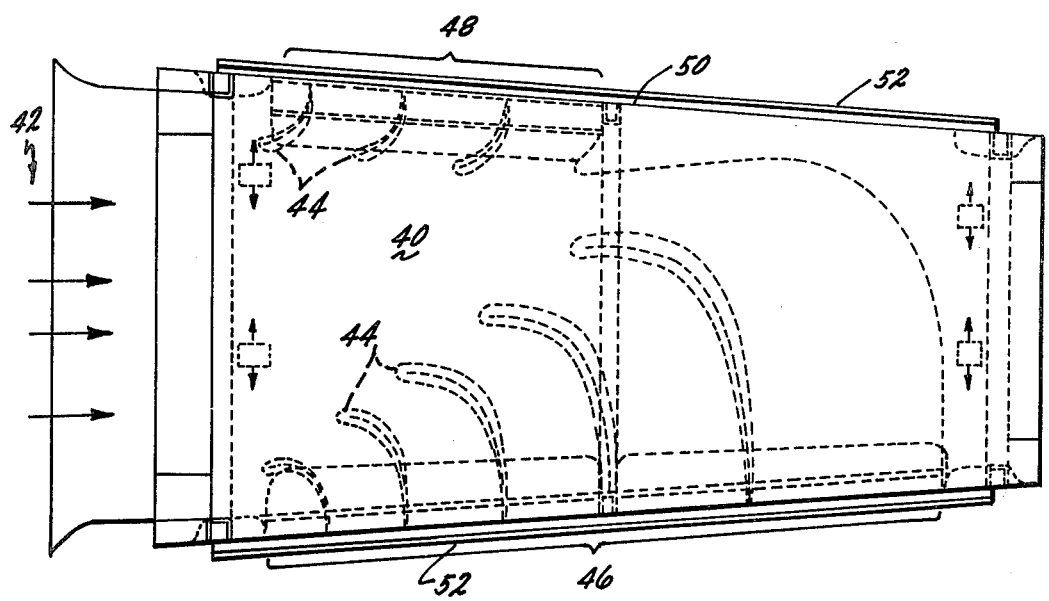
FIG. 3 is a cross-sectional view of the aft portion of the fuselage in the direction 3—3 of FIG. 1 showing the stationary vanes used to produce a lateral flow of air in a preferred embodiment of the present invention; and, FIG. 4 is a diagram showing a perspective view of the throttle and its control system, used in a preferred embodiment of the present invention to control the discharge of air from the jet thruster at the aft portion of the fuselage.

FIG. 3 is a cross-sectional view looking downwards on the aft section of the fuselage 22. Air from the fan 32 is blown into the chamber 40 as indicated by the arrows 42. The chamber 40 is provided with a number of stationary vanes 44 which efficiently redirect the flow of air from its aftward direction to a lateral direction so that it is discharged through the apertures 46, 48 on the left and right sides of the fuselage 22, respectively.

The outer surface 50 of the chamber as shown in FIG. 3 has the form, generally, of a frustum, in a preferred embodiment. In other embodiments, the chamber may have a cylindrical shape.

Figure 4:
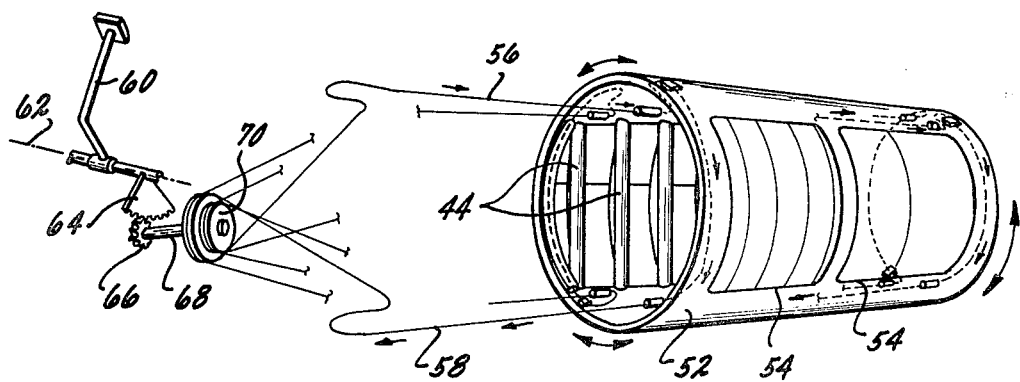

As best seen in FIG. 4, the flow of air through the apertures 46, 48 is controlled by the throttle 52.

In the preferred embodiment, the throttle 52 has the form of a conical sleeve which conforms closely in shape to the conical outer surface 50 of the chamber 40. The throttle 52 is provided with openings 54 which are brought into various degrees of registration with the apertures 46, 48 of the chamber 40 to control the lateral discharge of air. As shown in FIG. 4, rotation of the sleeve-like throttle 52 is achieved by the use of cables 56, 58 which are controlled by a foot pedal 60 located in the cabin 20 of the helicopter 12.

The control mechanism for the throttle includes the foot pedal 60 which is pivotable about the axis 62 to turn the gears 64, 66. The gear 66 is connected by a chain 68 to a spool 70 on which the cables 56, 58 are wound and unwound. The control mechanism permits the throttle 52 to be rotated relative to the apertures 46, 48 from a position in which all of the air is discharged on one side of the fuselage, to a position in which all of the air is discharged on the other side of the fuselage.

Under most flight conditions, the greater part of the antitorque force is supplied by the circulation control effect implemented by the linear nozzle 34. The circulation control effect is augmented by the jet thruster when flight conditions require, and both the amount and direction of the jet thruster reaction force can be controlled from the cabin.

Thus, there has been described a helicopter antitorque system which includes a linear nozzle of considerably wider width than that used in prior art circulation control devices and supplied by a subsonic low-pressure-ratio fan, and augmented for use at high speed flight by a direct jet thruster. Unlike circulation control systems of the prior art, the present system is highly efficient in its use of power and requires little additional weight. The present invention is sufficiently light and uses so little power that it is directly competitive with the tail rotor conventionally used. Thus, the antitorque system of the present invention can perform the same function as the tail rotor under the same wide range of flight conditions and can do so with comparable weight and power.

The foregoing detailed description is illustrative of the preferred embodiment of the invention, but it will be understood that additional embodiments will be obvious to those skilled in the art. The embodiments described herein together with those additional embodiments are considered to be within the scope of the present invention.

What is claimed is:

1. For use in a helicopter having a fuselage elongated in a longitudinal direction, suspended beneath a main rotor, and extending aftward from the center of the main rotor through the rotor downwash to an aft end, an antitorque system usable at high flight speeds, comprising:
   a linear nozzle extending generally in the longitudinal direction along the fuselage on one side of it and oriented to discharge a sheet of fluid substantially tangentially to the fuselage and downwardly around it;
   a source of fluid communicating with said linear nozzle to supply fluid to it under sufficient pressure to produce a flow of fluid through said linear nozzle characterized by a momentum coefficient between 0.2 and 0.8, a flow velocity between 2.5 and 4.5 times the velocity of the rotor downwash, and wherein the thickness of the sheet of fluid as it is discharged from said linear nozzle is between 4.0 and 20.0 millimeters; and,
   a jet thruster located near the aft end of the fuselage, communicating with said source of fluid to receive fluid from it, and oriented to discharge the fluid laterally from the side of the fuselage opposite the side on which said linear nozzle is located so as to produce an antitorque reaction force when flight conditions render said linear nozzle ineffective for that purpose.

2. The antitorque system of claim 1 wherein said source of fluid is a chamber within said fuselage, and further comprising a subsonic low pressure-ratio fan oriented relative to said chamber so as to blow air into it and to maintain an overpressure within said chamber.

3. The antitorque system of claim 2 wherein said chamber further comprises a surface having an aperture disposed along a side of the fuselage; and further comprising:
   a throttle including a sheet substantially in contact with said surface and selectively movable over said surface to obstruct said aperture to a chosen degree;
   said jet thruster communicating with said source of fluid through said aperture, so that the flow of fluid to said jet thruster is dependent on the chosen degree to which said sheet obstructs said aperture.

4. The antitorque system of claim 3 further comprising a control mechanism located in the cabin of the helicopter and connected to said throttle so that the position of said throttle on said surface is determined by the position of said control mechanism, whereby the degree of obstruction can be controlled from the cabin.

5. The antitorque system of claim 1 wherein said linear nozzle is located along the fuselage at a region at least partly within the rotor downwash when the helicopter is hovering.

6. The antitorque system of claim 1 wherein said fuselage has a generally rounded cross section transverse to the longitudinal direction, and wherein said linear nozzle is located below the widest part of the fuselage.

7. The antitorque system of claim 6 wherein said cross section is substantially symmetric about a longitudinal axis, and wherein said linear nozzle is located at an angle measured at the axis of between 70 and 160 degrees from the vertical.

8. The antitorque system of claim 1 wherein the velocity of the fluid as it emerges from said linear nozzle is between 30 and 120 meters per second.

9. For use in a helicopter having a fuselage elongated in a longitudinal direction, suspended beneath a main rotor, and extending aftward from the center of the main rotor through the rotor downwash to an aft end, an antitorque system usable at high flight speeds, comprising:
   a linear nozzle extending generally in the longitudinal direction along the fuselage on one side of it and oriented to discharge a sheet of fluid substantially tangentially to the fuselage and downwardly around it;
   a chamber within the fuselage, having a surface including an aperture, said chamber communicating with said linear nozzle, said surface having the shape of a portion of a cone whose axis is generally aligned with the longitudinal direction of the fuselage;
   a subsonic low-pressure-ratio fan oriented relative to said chamber so as to blow air into it and to maintain an overpressure within said chamber sufficient to produce a flow of fluid through said linear nozzle characterized by a momentum coefficient between 0.2 and 0.8, and a flow velocity between 2.5 and 4.5 times the velocity of the rotor downwash;
   a throttle in the form of a sleeve substantially in contact with said surface and conforming generally to the shape of said surface, having an opening, and mounted for rotation about said axis so that said opening overlaps said aperture to a chosen degree to obstruct the flow of fluid through said aperture to a chosen extent; and,
   a jet thruster located near the aft end of the fuselage, communicating with said chamber through said aperture to receive fluid from said chamber, and oriented to discharge the fluid laterally from the side of the fuselage opposite the side on which said linear nozzle is located so as to produce an antitorque reaction force when flight conditions render said linear nozzle ineffective for that purpose.

10. For use in a helicopter having a fuselage elongated in a longitudinal direction, suspended beneath a main rotor, and extending aftward from the center of the main rotor through the rotor downwash to an aft end, an antitorque system usable at high flight speeds, comprising:
   a linear nozzle extending generally in the longitudinal direction along the fuselage on one side of it and oriented to discharge a sheet of fluid substantially tangentially to the fuselage and downwardly around it;
   a chamber within the fuselage, having a surface including an aperture, said chamber communicating with said linear nozzle, said surface having the shape of a portion of a cylinder whose axis is generally aligned with the longitudinal direction of the fuselage;

a subsonic low-pressure-ratio fan oriented relative to said chamber so as to blow air into it and to maintain an overpressure within said chamber sufficient to produce a flow of fluid through said linear nozzle characterized by a momentum coefficient between 0.2 and 0.8, and a flow velocity between 2.5 and 4.5 times the velocity of the rotor downwash;

a throttle in the form of a sleeve substantially in contact with said surface and conforming generally to to the shape of said surface, having an opening, and mounted for rotation about said axis so that said opening overlaps said aperture to a chosen degree to obstruct the flow of fluid through said aperture to a chosen extent; and, a jet thruster located near the aft end of the fuselage, communicating with said chamber through said aperture to receive fluid from said chamber, and oriented to discharge the fluid laterally from the side of the fuselage opposite the side on which said linear nozzle is located so as to produce an anti-torque reaction force when flight conditions render said linear nozzle ineffective for that purpose.

* * * * *

UNITED STATES PATENT AND TRADEMARK OFFICE
CERTIFICATE OF CORRECTION

PATENT NO. : 4,200,252
DATED : April 29, 1980
INVENTOR(S) : Logan, et.al.

It is certified that error appears in the above-identified patent and that said Letters Patent are hereby corrected as shown below:

At column 5, line 64, delete "tastest" and insert --fastest--.

At columns 5 and 6, between lines 18 and 24 the equation should read $$\text{"Momentum Coefficient} = 2 \left( \frac{\text{density of jet}}{\text{air density}} \right) \times \left( \frac{\text{discharge velocity}}{\text{downward velocity}} \right)^2 \left( \frac{\text{slot width}}{\text{fuselage diameter}} \right) \text{"}$$

At column 2, line 8, delete "culatipn" and insert --culation--.

Signed and Sealed this

Third Day of November 1981

[SEAL]

Attest:

GERALD J. MOSSINGHOFF

Attesting Officer     Commissioner of Patents and Trademarks